INVENTOR
James G. Marriott
BY
Collins & Oberlin
ATTORNEYS

Dec. 5, 1972    J. G. MARRIOTT    3,705,047
METHOD OF REPAIRING ELECTRICALLY CONDUCTING FRIT CIRCUITS
Filed May 23, 1969    2 Sheets-Sheet 2
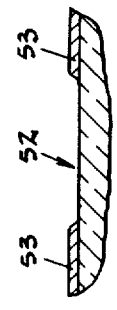
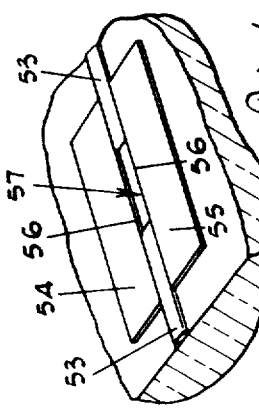
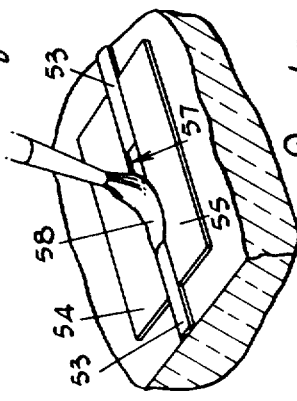
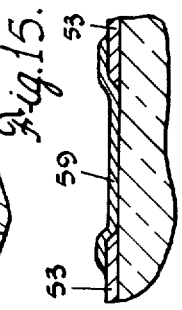
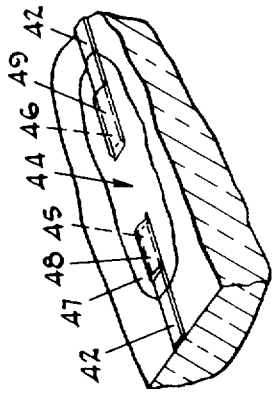
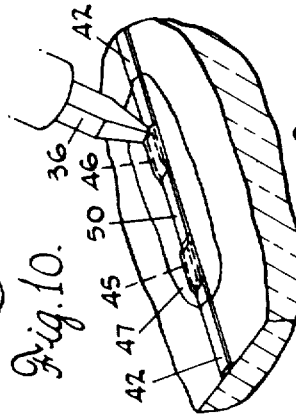
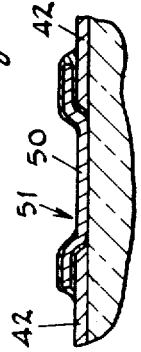
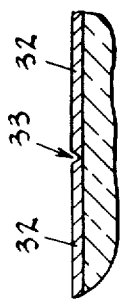
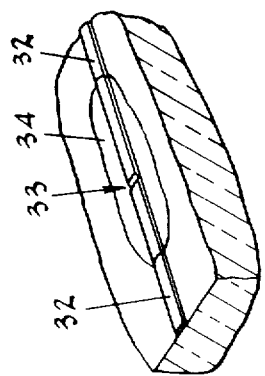
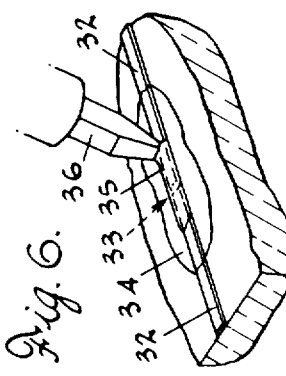
INVENTOR
James G. Marriott
BY Collins & Oberlin
ATTORNEYS

United States Patent Office 3,705,047
Patented Dec. 5, 1972

3,705,047
METHOD OF REPAIRING ELECTRICALLY CONDUCTING FRIT CIRCUITS
James G. Marriott, Perrysburg, Ohio, assignor to Libbey-Owens-Ford Company, Toledo, Ohio
Filed May 23, 1969, Ser. No. 827,263
Int. Cl. B22d *19/10;* B23p *3/00;* B41m *3/08*
U.S. Cl. 117—2                     3 Claims

ABSTRACT OF THE DISCLOSURE

Methods of repairing or restoring electrical heating circuits composed of electrically conducting metal containing frit lines fired on a vitreous substrate, which lines contain cracks or discontinuities therein that render such lines nonconductive.

---

This invention relates generally to electrical heating systems for vitreous articles and more particularly to heating circuits comprising a plurality of narrow electrically conducting frit lines fired on glass surfaces and improved methods for repairing or restoring such lines in which breaks have occurred.

It has heretofore been suggested to provide an electrically conducting glass glazing by applying a finely divided suspension of metallic silver or other highly conductive metal and a low melting frit disposed in a liquid organic binder to a surface of a glass sheet. This suspension is applied for example by the conventional silk screen process in narrow bands or lines which can be distributed over the entire sheet or only in a selected area thereof through which it is important to maintain visibility. The suspension after application is fired by heating to a temperature within the range of approximately 900° F. to 1250° F. to form an integral bond between the glass and the frit.

Preferably, the bands are arranged in straight lines and in parallel relationship to one another with the composition, thickness, width and distance between the lines being selected such as to provide sufficient electrical energy to produce a suitable heating output and pattern yet not objectionably interfere with vision.

The frit lines or bands are extremely fragile and care must be taken both in depositing them on the vitreous surface and in subsequent handling and processing of the substrate to which they are applied to prevent damage thereto. However, due to the complexities and hazards inherent in any production line operation, it is substantially impossible to avoid damage or not to produce some defective parts.

It will be appreciated that even a very minute break, discontinuity or undue thinning of a frit line will deleteriously affect the electrical properties of the circuit and render same unsatisfactory for its intended purpose, e.g., maintaining the glazing free from condensation or frost. Further, since these defects do not normally become apparent until a glazing, e.g., an automobile backlight, has been completely processed, i.e., bent and tempered, failure thereof represents a very costly reject.

In a similar manner, damage to the frit lines may occur after installation of the glazing into an automobile since they are generally exposed to the interior of the automobile. Thus, damage can be done unknowingly by the use of abrasive cleaning compounds, striking or rubbing hard objects on or across the glass surface or simply placing packages or like articles in positions where vibration may cause the articles to bump against the lines. Evidence of such damage to the circuit will become apparent during the use of the heating system by the presence of unheated areas on which frost or condensation remains. Without a satisfactory system of repair, it is necessary to install a completely new glazing in the automobile to again obtain an operational unit.

It has now been discovered, and the instant invention is based upon such discovery, that defects of the nature above described in the frit lines can be repaired by first cleaning the nonconductive area, such as by burnishing same with a slightly abrasive material, and thereafter applying a relatively soft, silver bearing solder heated to its point of softening to the frit line to bridge the nonconductive area and establish an electrically conducting path thereacross. In the event the nonconductive area is a break or gap of sufficient length and depth such that a substantial portion of the glass surface is exposed, it is proposed that a fine sliver of a pliable, electrically conducting metal be positioned across the area of the break and soldered to the frit line or, alternately, that a silver paint such as an air dry silver composition or a two part, epoxy-silver mixture be applied to the discontinuity to re-establish conductivity thereacross.

It is accordingly a principal object of the present invention to provide a method of repairing breaks in electrically conducting frit circuits disposed on vitreous surfaces.

Another object of the invention is to provide a relatively simple and efficient method of restoring electrical conductivity to a frit heating circuit in which breaks or discontinuities have occurred.

Other objects and advantages of the invention will become apparent during the course of the following description when taken in connection with the accompanying drawings.

In the drawings, wherein like numerals are employed to designate like parts throughout the same:

FIG. 5 is a sectional view taken on line 4—4 of FIG. 3;

FIGS. 6 and 7 are perspective views illustrating one method of restoring the continuity of the line of FIG. 5 in accordance with the invention;

FIG. 8 is a sectional view of the restored line;

FIG. 9 is a sectional view taken on line 9—9 of FIG. 4;

FIGS. 10 and 11 are perspective views illustrating a method of restoring the continuity of the line of FIG. 9 in accordance with the invention;

FIG. 12 is a sectional view of the restored line;

FIG. 13 is a sectional view of an electric conducting frit line with a discontinuity therein;

FIGS. 14 and 15 are perspective views illustrating a method of restoring the continuity of the line of FIG. 13 in accordance with the invention; and FIG. 16 is a sectional view of the restored line.

Figure 1:
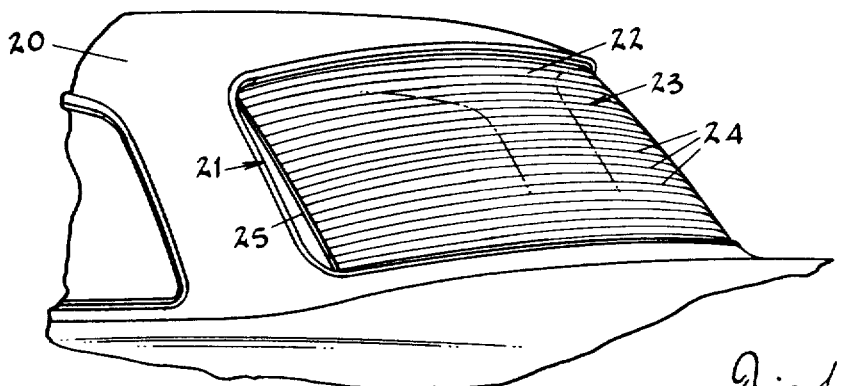
FIG. 1 is a partial perspective view of an automobile provided with a rear window which is electrically heated by means of a frit circuit disposed thereon.
Figure 2:
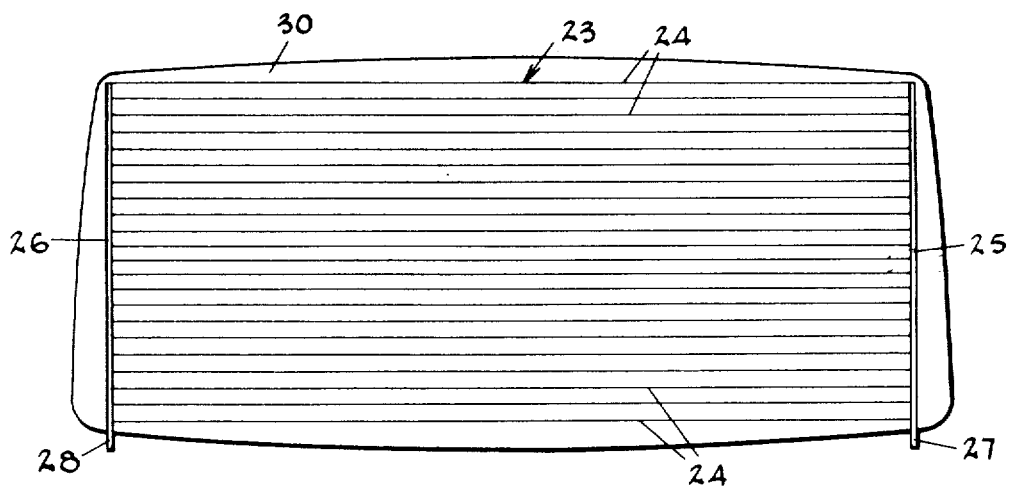
FIG. 2 is a plan view of the window.

Referring now to FIG. 1 of the drawings, there is illustrated therein an automobile 20 in which the rear window opening 21 is glazed with a curved sheet of glass 22 which preferably has been tempered upon completion of the heating and bending thereof. In order to maintain an unobstructed view through the rear window, it has been proposed to provide an electrical heating grid or circuit indicated generally at 23 comprising a plurality of substantially parallel disposed electrically metal containing frit lines 24 on the inwardly directed or inboard surface of the glazing. These lines or bands 24 are connected at their opposite ends to electrodes or bus bars 25 and 26 (FIG. 2) located at either side of the glass sheet 22. An electrical circuit is completed through the electrodes and the frit lines by way of terminals 27 and 28 and the battery of the automobile.

To produce the glazing 22, a flat glass sheet 30 of the desired pattern cut outline is provided with the frit lines 24 preferably such that they are disposed in generally parallel arrangement with the horibzontal axis of the parallel arrangement with the horizontal axis of the sheet. The frit appears as only very fine lines on the surface of the glass sheet so that they do not materially obstruct the viewing area, their size being somewhat exaggerated in the drawings for purposes of illustration. While the lines and bus bars can be formed of any of a number of suitable electrically conductive frit materials well known in the art, one composition which has been found acceptable comprises a silver paste containing approximately 70 percent by weight silver, 5 percent by weight glass frit and 25 percent by weight organic binders and solvents. In general, acceptable ranges for these compositions are 50 percent to 85 percent by weight silver, 1 to 10 percent by weight glass frit and 5 to 50 percent by weight organic binders and solvents. The above-mentioned lines are very fine, normally being on the order of about 0.025 inch in width and from 0.3 mil to 1.5 mil in thickness, and are spaced apart a distance dependent chiefly upon the desired electrical characteristics of the glazing, generally on the order of between one and two inches. During heating of the glass sheet to an elevated temperature for bending and subsequent tempering of same, the frit lines and bus bars are fired and fused onto the glass surface to form an integral, tightly adherent bond therebetween.

As previously mentioned, either during handling of the glazings after the above described fabricating operations or by excessively abrasive cleaning or striking of the frit lines after subsequent installation of the glazing in an automobile, breaks or undue thinning thereof can occur and result in destroying the desired electrical properties of the unit.

Figure 3:
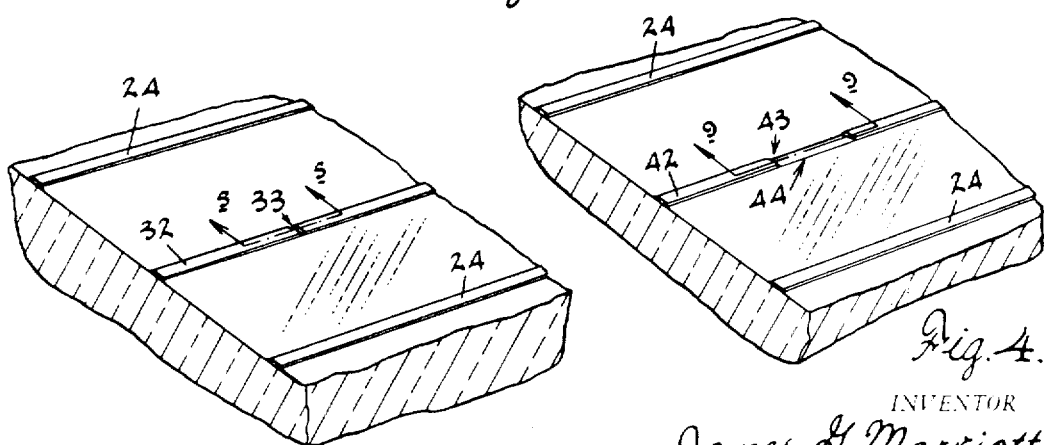
FIG. 3 is an enlarged fragmentary perspective view of the electrically conductive frit lines or bands, one of which contains a minute discontinuity therein.
Figure 4:
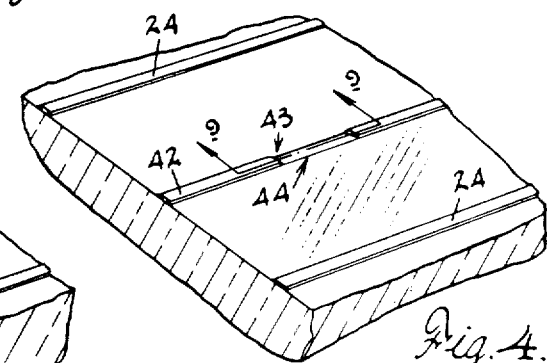
FIG. 4 is an enlarged fragmentary perspective view of the electrically conducting frit lines, one of which contains an elongated discontinuity therein.

By way of example, two forms of breaks or discontinuities are illustrated in FIGS. 3 and 4. Thus, the frit line 32 of FIG. 3 is indicated as having a substantial thinning or crack 33 across its width of a depth sufficient to interrupt the desired flow of electrical energy across the crack. FIG. 4 illustrates a second form of damage to a line 42 which has resulted in the creation of a gap 43 of substantial length and to a depth such that an appreciable area 44 of glass surface is exposed.

With reference to FIGS. 5 through 8, the flow of electrical energy through the line 32 is restored in accordance with the invention by the application of a small amount of solder at and over the area of the thinning 33. For this purpose, the method contemplated by the invention includes first cleaning the area to be covered with the solder, for example by burnishing same with a relatively fine emery cloth or ink eraser, and then preferably adding a small amount of a non-corrosive rosin flux to the area as indicated by the numeral 34 in FIG. 6. A soft, silver bearing solder is then applied to the area as shown at 35 in FIG. 7 by means of a small pencil-type soldering iron 36 that is maintained at an elevated temperature just above the melting point of the solder. One solder material which has been found to be particularly adapted for use in this embodiment comprises 3 percent by weight silver, 61.5 percent by weight tin and 35.5 percent by weight lead, although it should be understood that other commercially available silver bearing solders, e.g., containing on the order of 1 to 4 percent by weight silver may be employed. In this respect, another specific solder that may be used has a nominal composition of 62 percent by weight lead, 36 percent by weight tin and 2 percent by weight silver. Since the dab of solder 35 will adhere only to the metal of the frit line, the resulting bridging layer 37 as shown in FIG. 8 will be substantially no wider than the actual width of the line. In this connection, after the repaired area has been cleaned by the use of a soft cloth, the location of the repair is extremely difficult to locate.

As previously mentioned, the damage to a frit line as shown in FIG. 4 and FIGS. 9 through 12 has resulted in a definite gap 43 in the line and an exposed area on the glass surface 44. Thus it will be appreciated that merely applying a solder layer, for example at 48 and 49, in accordance with the first method of repair as described above would not be satisfactory since the solder would not adhere to the glass surface area 44. To repair a break of this magnitude, the invention contemplates first burnishing the spaced ends 45 and 46 of the discontinuity and then preferably applying a rosin flux 47 in a similar manner as defined above. A very fine sliver of a pliable, electrically conducting metal is then placed in the discontinuity to form a bridge between the ends 45 and 46. This metal sliver 50 which, for example, may be composed of tinned copper shim stock, with which excellent results have been obtained, is attached through the silver-bearing solder layers disposed on the opposite ends of the gap 43 by employment of the soldering iron 36. This results in the positioning of a actual metal bridge 51 acrosse the area of the gap and particularly over the exposed glass surface. This repair has been found to provide a strong, adherent conductor in the area of the gap and an excellent conductive path for the electric current.

While in both of the above embodiments it has been stated that it is preferable to employ a rosin flux prior to the soldering operation, this step may be omitted if the area is sufficiently clean to receive and hold the solder. This has been found often to be the case if the repair is made prior to assembly and shortly after firing of the frit.

Another mode of repairing substantial gaps or discontinuities in the frit lines in accordance with the invention is illustrated in FIGS. 13 through 16. In accordance with this embodiment, the break 52 causing the discontinuity in the frit line 53 is repaired by the use of an air dry silver composition, for example, comprising about 43 percent by weight silver flakes and 57 percent by weight of a lacquer binder, or a two part, epoxy-silver paint. To this end, strips of a masking material 54 and 55 are positioned on the glass surfaces with their inwardly disposed edges 56 overlapping the ends of the frit line 53 to form an open area 57 having a width substantially the same as that of the line. As viewed in FIG. 15, the aforementioned air dry silver composition or epoxy-silver paint is then brushed on as at 58. When the paint has dried sufficiently for removal of the masking strips 54 and 55, the edges of the painted area can be trimmed if necessary by a sharp instrument, such as a razor blade or the like. The resulting repaired area shown at 59 in FIG. 16 has been found to completely restore conductivity across the frit line 53 without significantly changing the appearance of the line.

I claim:

1. A method of repairing discontinuities in an electrically conducting metal containing frit line fused on a glass surface of a window, a comprising burnishing the area of the discontinuity with a slightly abrasive material, applying an amount of a non-corrosive rosin flux to the burnished area, and thereafter applying a relatively soft silver-bearing solder heated to its point of softening to the frit line to bridge said discontinuity and establish an electrically conducting path thereacross.

2. A method as defined in claim 1, wherein said solder contains from 1 percent to 4 percent by weight silver.

3. A method of repairing discontinuities in an electrically conducting metal containing frit line fused on a glass window surface, comprising masking areas of the glass surface on either side of the discontinuity so as to leave an unmasked area of the same width as the frit line, applying a suspension of silver flake and binder in an air dry vehicle to said discontinuity, drying said suspenson, and thereafter removing the masking to establish an electrically conducting path across said discontinuity.

References Cited
UNITED STATES PATENTS

| | | | |
|---|---|---|---|
| 3,134,085 | 5/1964 | Miller et al. | 29—630 D |
| 3,200,010 | 8/1965 | Phace Sr. | 338—309 X |
| 2,921,257 | 1/1960 | Boisey | 117—212 UX |

FOREIGN PATENTS

| | | | |
|---|---|---|---|
| 472,264 | 7/1944 | Canada | 117—2 |

OTHER REFERENCES

Circuit Repair and Fabrication by Foulner—IBM Tech. Div. Bulletin—vol. 9, No. 10, March 1967.

Printed and Integrated Circuitry by Schlabach et al., July 1963, copy in Scientific Library, pp. 237–240 and 245–246 relied upon.

JOHN F. CAMPBELL, Primary Examiner

R. W. CHURCH, Assistant Examiner

U.S. Cl. X.R.

29—401, 625, 611, 620; 117—212; 174—68.5